United States Patent
Koyama et al.

(10) Patent No.: US 7,763,092 B2
(45) Date of Patent: Jul. 27, 2010

(54) FILTER FOR AN AIR BAG GAS GENERATOR

(75) Inventors: Kazuya Koyama, Tochigi (JP); Naoki Matsuda, Hyogo (JP); Masato Hirooka, Hyogo (JP); Masayuki Yamazaki, Hyogo (JP)

(73) Assignees: Daicel Chemical Industries, Ltd., Sakai-shi (JP); Fuji Filter Manufacturing Co., Ltd., Tokyo (JP)

( * ) Notice: Subject to any disclaimer, the term of this patent is extended or adjusted under 35 U.S.C. 154(b) by 562 days.

(21) Appl. No.: 10/578,516

(22) PCT Filed: Jan. 6, 2005

(86) PCT No.: PCT/JP2005/000322

§ 371 (c)(1),
(2), (4) Date: Mar. 12, 2007

(87) PCT Pub. No.: WO2005/065999

PCT Pub. Date: Jul. 21, 2005

(65) Prior Publication Data

US 2007/0214768 A1 Sep. 20, 2007

(30) Foreign Application Priority Data

Jan. 7, 2004 (JP) .............................. 2004-001593

(51) Int. Cl.
*B01D 39/10* (2006.01)
*B01D 46/00* (2006.01)
*B60R 21/26* (2006.01)

(52) U.S. Cl. ............................ 55/487; 55/488; 55/523; 55/525; 280/736; 280/740; 280/742

(58) Field of Classification Search .................. 55/486, 55/487, 489, 523, 525, 526, 488; 280/736, 280/740, 742

See application file for complete search history.

(56) References Cited

U.S. PATENT DOCUMENTS

| 2,664,375 | A | * | 12/1953 | Slayter ........................ 156/167 |
| 2,857,657 | A |   | 10/1958 | Wheeler, Jr. |
| 3,526,557 | A | * | 9/1970  | Taylor, Jr. .................... 156/167 |
| 5,087,070 | A |   | 2/1992  | O'Loughlin et al. |
| 5,564,741 | A |   | 10/1996 | Ward et al. |

(Continued)

FOREIGN PATENT DOCUMENTS

JP      01-1293112      11/1989

(Continued)

*Primary Examiner*—Michael A Marcheschi
*Assistant Examiner*—Robert A Clemente
(74) *Attorney, Agent, or Firm*—Birch, Stewart, Kolasch & Birch, LLP

(57) ABSTRACT

A filter for a gas generator in which the manufacture is simple, which has an adequate filter performance and cooling performance and, furthermore, which has high reliability with little damage caused in actuation of the gas generator, is provided. The filter for an air bag gas generator comprises a first layer formed from helically wound wire rods having a cross-sectional area of 0.03 to 0.8 $mm^2$, in such a way that the pitch angle of wire rods vertically superposed in the radial direction is symmetrical, and a second layer that exists on the outer side of the first layer in the radial direction and is formed to have a finer filter particle size than the first layer using a wire rod narrower than the wire rod that forms the first layer.

18 Claims, 3 Drawing Sheets

U.S. PATENT DOCUMENTS

Figure 1:
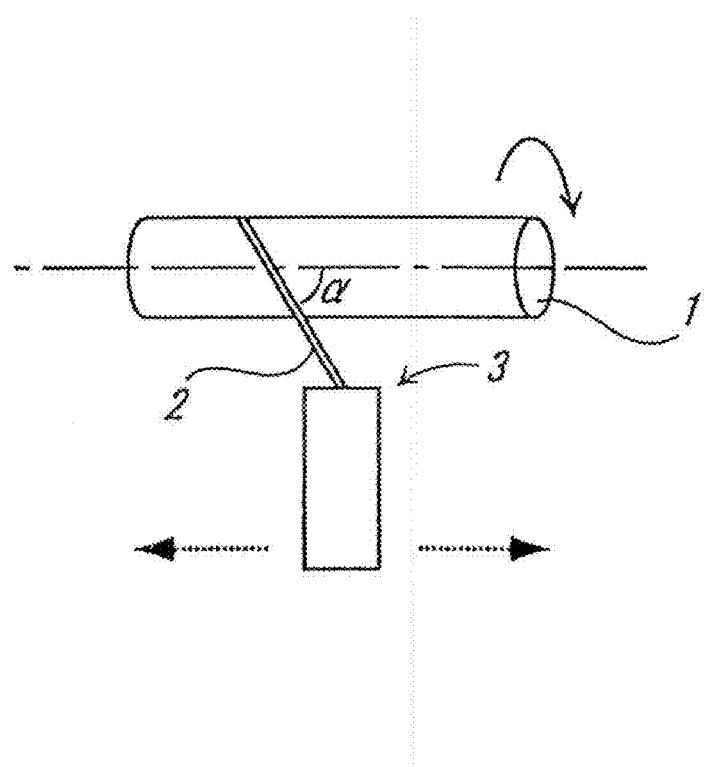

| | | | | |
|---|---|---|---|---|
| 5,908,481 A * | 6/1999 | Siddiqui | | 55/485 |
| 6,234,521 B1 * | 5/2001 | Katsuda et al. | | 280/736 |
| 7,449,042 B2 * | 11/2008 | Hirata | | 55/525 |
| 7,452,397 B2 * | 11/2008 | Hirata | | 55/525 |
| 2003/0057687 A1 * | 3/2003 | Nakashima et al. | | 280/736 |

FOREIGN PATENT DOCUMENTS

| | | |
|---|---|---|
| JP | 5-329358 | 12/1993 |
| JP | 06-055991 | 3/1994 |
| JP | 8-309178 A | 11/1996 |
| JP | 3041850 U | 7/1997 |
| JP | 11-348712 A | 12/1999 |
| JP | 2000-198409 | 7/2000 |
| JP | 2001-171472 A | 6/2001 |
| JP | 2001-171473 A | 6/2001 |
| JP | 2001-301561 A | 10/2001 |
| JP | 2001-315611 A | 11/2001 |
| JP | 2002-514135 A | 5/2002 |
| JP | 2002-306914 A | 10/2002 |
| WO | WO-98/34712 A1 | 8/1998 |

* cited by examiner

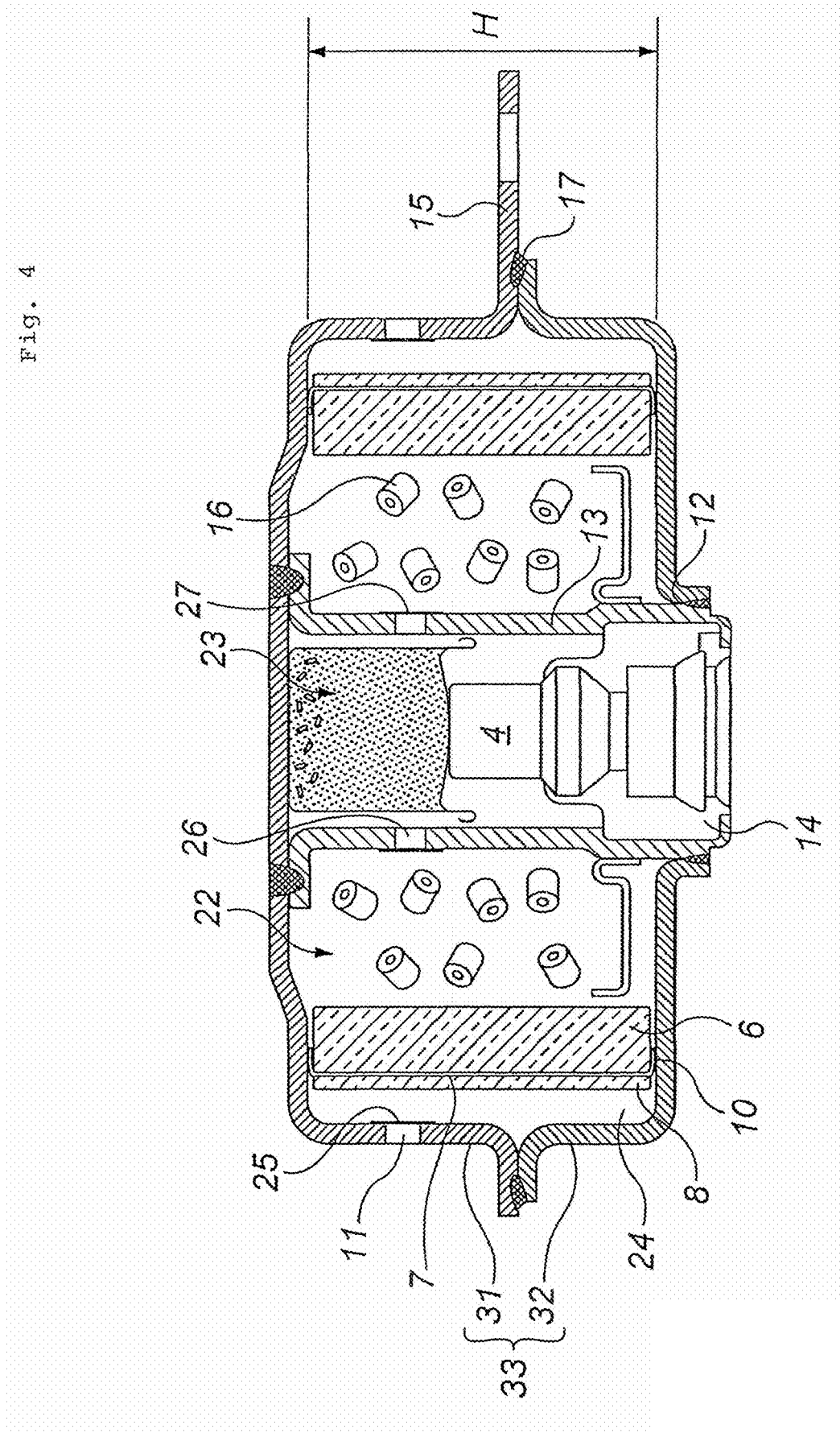

FILTER FOR AN AIR BAG GAS GENERATOR

TECHNICAL FIELD

The present invention relates to a filter used in a gas generator, particularly in a gas generator for inflating an air bag mounted in an automobile.

PRIOR ART

In gas generators for air bag systems that offer protection of passengers from the impact of a collision, it is desirable that the gas used to inflate the air bag be clean at all times. More particularly, in gas generators affixed to automobiles or the like, because the volume of space within the vehicle interior (cabin) is small and, in addition, when the car windows are closed, because the space within the vehicle interior constitutes a highly airtight state, even greater importance is attached to the need for the cleanliness of the gas that is generated to inflate the air bag upon the actuation of the gas generator.

In addition, conventional gas generators include those in which the gas for inflating the bag is generated by the ignition and combustion of a solid gas-generating agent (pyrotechnic type gas generator), those in which combustion gas or heat generated by the combustion of a solid gas-generating agent and a pressurized gas charged inside a housing (airtight container) are employed as the gas for inflating the bag (hybrid-type gas generator), and those in which the air bag is inflated by just a pressurized gas charged inside a housing (airtight container) (stored-type gas generator). The most advantageous of these gas generators in terms of overall weight lightening thereof is the pyrotechnic type gas generator. In pyrotechnic type gas generators, a solid gas-generating agent should be burned in order to generate the gas for inflating the air bag and, as a result of the combustion of the gas generating agent, a combustion residue (solid material), which constitutes a by-product of the gas, is generated. As there is a possibility that such a combustion residue discharged together with the gas for inflating the air bag to the exterior of the gas generator housing will damage the air bag, it is essential that the combustion residue be retained inside the housing. For this reason, pyrotechnic gas generators employ a filter for collecting the combustion residue, and a variety of such filters have been proposed hitherto.

If the generated residue has a melting point less than the temperature of combustion of the gas generating agent, it is formed as a liquid, so that this is difficult to collect using just a wire mesh or porous member.

Examples of prior arts that pertain to filters used in air bag gas generators include JP-A No. 6-55991, JP-A No. 1-293112 and JP-A No. 2001-171472.

The filter for an air bag gas generator disclosed in JP-A No. 6-55991, as is shown in FIG. 1 thereof, comprises three wire mesh layers (22a, 22b, 22c), and as for the wire meshes of which each of the layers are formed, metal wire rods formed as either plain weave wire meshes or that have been hosiery knitted are employed. The wire mesh layers 22a, 22c are formed from two wire meshes, and the wire mesh layer 22b is formed from three wire meshes. However, the collection of a liquid combustion residue is difficult using a filter such as this and, not only this, the wire meshes that constituted the filter can be melted. The reason for this is that, in order to collect the liquid combustion residue while preventing the melting of the wire mesh, the wire mesh layers to which the gas of high temperature has initial contact should be able to fulfill a heat sink-like role but, using just an inner side wire mesh layer 22c formed from two metal meshes, an adequate heat sink function cannot be performed. In addition, when a plain weave wire mesh or the like is wound in multiple layers (for example, when formed in a cylindrical shape), the wire rods from which this is constituted buffer each other and form an uneven end surface. By the simple abutting of an uneven end surface on a flat housing inner surface, a short pass for gas occurs at the abutting section. Furthermore, because there is a lack of elasticity in the axial direction when a plain weave wire mesh is wound in multiple layers, a short pass for gas is liable to occur at the surface abutting the housing inner surface (that is to say, the end surface of the filter).

In addition, the filter for an air bag gas generator disclosed in JP-A No. 1-293112 employs wire rods of different wire diameter. For example, in the filter shown in FIG. 1 of the cited document, a tubular body 4 formed from a wire mesh by the hosiery knitting of a stainless steel wire having the wire diameter 0.1 to 0.4 mm is wound in a wound-bag shape on an annular body 8 formed from a wire mesh by the plain weave of a stainless steel wire having the wire diameter 0.5 to 2.0 mm, and is then pressed and compression-molded. However, in a filter formed in this way, because, on the inner surface thereof, there exists a wire rod having a narrow wire diameter that constitutes the tubular body 4, in the same way as the above JP-A No. 6-55991, not only is it unable to fulfill an adequate heat sink function when contacted by a high temperature gas, the melted wire rods themselves are thought to form a residue. In addition, FIG. 3 of JP-A No. 1-293112 illustrates the inner side arrangement of a wire rod having a thick wire diameter. However, even though said filter is advantageous in terms of its heat sink performance, it lacks elasticity in the axial direction because the plain weave wire rod is wound in a multiple number of layers and, furthermore, because the end surface thereof is uneven, this has the same inherent problem as described above in that a short pass for gas occurs.

JP-A No. 2001-171472 discloses a filter formed by winding of one wire rod around a core metal.

DISCLOSURE OF THE INVENTION

The present invention provides a filter for an air bag gas generator which solves the above problem, and more particularly a filter employed in an air bag gas generator that uses a solid gas-generating agent, and, more specifically, an object of the present invention is to provide a filter for an air bag gas generator, easily manufactured, having an adequate filter performance and cooling performance and, furthermore, having high reliability, causing little damage in actuation of the gas generator. In addition, the present invention also provides a gas generator that employs this filter for a gas generator, as well as a method for the manufacture of a filter for an air bag gas generator.

In order to solve the above problems, the filter for an air bag gas generator according to the present invention comprises a first layer formed by the helical winding of wire rods having cross-sectional area 0.03 to 0.8 mm$^2$ on a section that has initial contact with the gas generated by the combustion of the gas generating agent, which corresponds normally to the inner surface in the filter formed in a cylindrical shape, and a second layer having a higher combustion residue collecting function than the first layer in a location that is reached by the gas that passes through the first layer, which in most cases is on the outer side of the first layer. The cross-sectional area noted here refers to the cross-sectional area in the radial direction when the wire rod is cut in the radial direction.

That is to say, the filter for an air bag gas generator according to the present invention comprises a first layer formed by helically winding wire rods that has a cross-sectional area of 0.03 to 0.8 mm$^2$ (in the case of a perfect circle, wire diameter of 0.2 mm to 1 mm), and more preferably 0.05 to 0.5 mm$^2$ (in the case of a perfect circle, wire diameter of 0.25 mm to 0.8 mm) of which the pitch angle of wire rods vertically superposed in the radial direction is symmetrical, and a second layer that exists on the outer side of the first layer in the radial direction and is formed to have a finer filter particle size than the first layer.

The pitch angle α of the wire rods vertically superposed in the radial direction of the first layer in the above filter is formed symmetrically. That is to say, where the wire rod positioned in the lower side in the radial direction is wound at a pitch angle (angle between a helix and the center axis Z of a helix: as described in the later-described FIG. 1) +α, the wire rod superposed thereon is wound at a pitch angle −α.

The filter for an air bag gas generator of the present invention, and particularly a cylindrical filter can be manufactured as a filter for an air bag gas generator comprising a first layer and a second layer. In the first layer, adjacent wire rods are formed essentially parallel with each other. Such a first layer is obtained by winding plural times a metal wire rod having a cross-sectional area of 0.03 to 0.8 mm$^2$ in such a way that a reciprocating process in the axial direction of the filter is conducted plural times accompanying the rotation of the filter, the reciprocating process in which one metal wire rod having the above cross-sectional area is wound around the filter from one end portion toward the other end portion and is then return-wound to the first end portion. And the second layer is provided on the outer side of the first layer and has a finer filter particle size or smaller opening ratio than the first layer. Once the length has been formed in the axial direction at this time, this can then be cut to form each desired axial core length, or it can be formed to these required axial core lengths in advance. Because fraying and the like is removed from the end surfaces of filters in which cutting is involved in the manufacture thereof, this is advantageous in terms of preventing a short pass for gas as well as in terms of shape retention after molding. Accordingly, in a filter for an air bag gas generator, desirably, the required axial core lengths are formed in advance and the manufacture thereof does not include the cutting. That is to say, such a filter for an air bag gas generator can be obtained that, the filter is formed cylindrically, and comprises a first layer formed by helically winding a wire rod having a cross-sectional area of 0.03 to 0.8 mm$^2$ in at least one reciprocating process in the axial direction of the filter, and a second layer existing on the outer side of the first layer in the radial direction and having a finer filter particle size than the first layer.

In the filter according to the present invention, the first layer can be manufactured by winding and knitting, to a jig, at least one wire rod having a cross-sectional area of 0.03 to 0.8 mm$^2$ in at least one reciprocating process at a prescribed tension, and more preferably a tension of 2 to 5 kgf, followed by the removal of the jig. This method of manufacture can be better understood with reference to JP-A No. 2001-171472.

In a filter comprising a first layer formed in this way, since of the many voids that are formed in the inner part of the filter in which the first layer exists, the residue within the combustion gas is likely to be retained within these voids. To that end, because the voids in the filter inner part are squashed in compression-molding of a filter formed by the compression-molding of a hosiery knit filter material (wire mesh) or the like, the residue collecting performance of the molded product is thought to be reduced. In addition, when the filter for an air bag gas generator is arranged. in a gas generator housing, the filter is compressed in the axial direction and arranged in the housing in a state of elastic deformation in such a way that no short pass for the gas for inflating the air bag occurs at the end surface of the filter in the actuation of the gas generator. However, because filters formed by the employment of a plain weave wire mesh lack compressibility in the axial direction, prevention of short pass for the gas in the filter end surface is difficult.

Further, the surface area thereof is enlarged when voids are formed in the filter inner part, and therefore, the contact surface area with the gas that is generated by the combustion of the gas generating agent or with the combustion residue can be increased. As a result, for example, even if the residue that is generated by the combustion of the gas-generating agent (combustion residue) is a liquid, said liquid residue cools and solidifies and changes into a state in which it is easily collected by the filter. In addition, because a wire rod having a cross-sectional area of 0.03 to 0.8 mm$^2$ is employed, this is able to withstand the temperature of combustion of a commonly used solid gas generating agent and no melting of the wire rod itself occurs. More particularly, the wire rod that constitutes the first layer is desirably formed from a metal such as iron.

There are no particular prescriptions with respect to the cross-sectional shape of the wire rod to be used for the first layer provided it complies with the above cross-sectional value range, and a perfect circle, ellipse, polygon or essentially rectangular shape or the like can be used. In addition, an essentially rectangular shape refers to, apart from shapes having four right-angle corner sections, other shapes such as those with rounded angle parts (angle part is a curve surface shape with R). However, in order that the heat generated when combustion of the gas generating agent occurs can be withstood, the minimum thickness of the first layer, or the thickness of the wire rod that forms the first layer or the minimum side length is preferably 0.19 mm.

Further, in the filter of the present invention, in a location that is reached by the gas that has passed through the first layer, for example on the outer side of the first layer in the radial direction, a second layer formed to have a finer filter particle size than the first layer is formed. The second layer can be formed from a filter material of filter particle size 6 to 400 μm, and preferably 10 to 150 μm, and more preferably 30 to 100 μm. As a result, small residue that passes through the first layer can be reliably collected. That is to say, even though the first layer formed as described above is able to demonstrate a filtering function with respect to a residue of a size of the order that is able to be collected in the space of the filter inner part, because a residue of a smaller size than this passes through the first layer, this is collected by the second layer.

For the filter material that forms this second layer, which should have the above filter particle size, apart from wire meshes of various types such as a plain Dutch weave wire mesh, twilled Dutch weave wire mesh and plain weave wire mesh, plate materials such as a punched metal, metal lath and expanded metal and, furthermore, ceramic fibres and stainless steel fibres can be used. Notably, in cases where shape retention is difficult such as with ceramic fibres or the like, the above first layer and a later-described third layer or another wire mesh or plate material can be employed to hold this second layer in a sandwich form. Furthermore, if a Dutch weave wire mesh is employed, different to a commonly used plain weave wire mesh, there are no openings formed in the direction that is perpendicular to the plane of the wire mesh, and all openings appearing between the wire rods are formed to open in the diagonal or lateral direction. That is to say, this is preferable in terms of the filtering of a fine residue because, for generated gas that passes through a Dutch weave wire mesh, it should first collide with the wire mesh and undergo a change in the direction. In addition, because the contact time with the wire rod of the second layer is lengthened when the gas is passed through in this way, an improved cooling performance is demonstrated.

Further, the second layer can be formed using a wire rod that is finer than the wire rod that forms the first layer. In this case as well, because of the existence of the first layer, no contact of the combustion flame of the gas-generating agent on the second layer occurs and, in addition, because the gas that reaches the second layer is cooled by the first layer, no melting of the second layer caused by heat or the like occurs. Furthermore, because liquid combustion residue is also cooled to form a solid in the voids of the first layer, even if the combustion residue in the initial stage of generation thereof is liquid, this too can be efficiently collected. That is to say, the effect of this is not produced by the first layer or the second layer independent of each other but by the synergistic effect afforded by the assembly of the two layers together.

If improvement to the collecting potential and resistance to melting caused by heat of a second layer such as this is to be considered, it is desirable that, if said second layer is formed from a wire rod, it is preferably formed from a wire rod having a cross-sectional area of 0.00031 to 0.38 $mm^2$, or more preferably 0.00049 to 0.13 $mm^2$, or still more particularly 0.0020 to 0.042 $mm^2$ and, for example, if the second layer is a perfect circle shape, it is preferably formed from a wire rod having a wire diameter of 0.02 to 0.7 mm, or furthermore 0.025 to 0.4 mm, and more particularly 0.05 to 0.23 $mm^2$. In addition, if it is to be formed from a wire mesh configured from a wire rod, it is particularly preferable that it be formed from a wire mesh configured from a wire rod of the cross-sectional area and wire diameter as described above.

In the filter for an air bag gas generator described above, it is desirable that a further third layer formed from a wire rod having a cross-sectional area larger than the wire rod of the second layer (for example, wire rod having a large wire diameter) be provided in a location that is reached by the gas that passes through the second layer, for example, on the outer side of the second layer in the radial direction. This third layer fulfills a function of pushing and holding the second layer against the first layer and, accordingly, it is formed to possess a shape retaining strength of the order that it is able to facilitate this function and, in addition, to possess an air resistance of the order that does not invite obstruction to the passing of gas that has passed through the first layer and the second layer. By the existence of a third layer such as this, there is no separation of the second layer from the first layer when gas passes through both the first layer and the second layer. A third layer such as this can be formed using a wire rod identical to, for example, the wire rod that forms the first layer. Although, because the combustion residue generated by the combustion of the gas generating agent can be adequately collected by the first layer and the second layer, there is little necessity for a cooling or filtering of the gas by a further third layer, a cooling/collecting function such as this may be able to be further fulfilled by a third layer to conform to the gas generating agent to be used.

The above third layer can be formed in the same way as the first layer. That is to say, it can be formed by helically winding a wire rod in such a way that the pitch angle α of vertically superposed wire rods in the radial direction are symmetrical (in the same way as the method of winding implemented for the above first layer, in such a way that the pitch angle α, with respect to an axis Z, of the later-described FIG. 1 of vertically superposed wire rods in the radial direction is symmetrical). As a result, the wire rods wound in a helical shape form a third layer in which the pitch angle of vertically superposed wire rods in the radial direction is symmetrical. In addition, the third layer can be formed by helically winding a wire rod in at least one reciprocating process in the axial direction of a cylindrical filter. As is described above, it is sufficient for the third layer to constitute a wire rod that has been wound to the extent that it is able to fulfill the function of pushing the second layer against the first layer, and there is no need for laminating of a wire rod to the same thickness as of the first layer. That is to say, the third layer can be formed as a simplification of the first layer. In addition, the pitch angle of the third layer may be the same or different to the first layer. In addition, the cross-sectional area of the wire rod used for the third layer may be the same or different to the first layer. By the adoption of this method of winding the first layer and the third layer, fine weight adjustments thereof are possible. That is to say, for example, if the filter is to be formed by winding a wire mesh or the like in multiple layers in the circumferential direction, in order to ensure that the air resistance and density are uniform in the circumferential direction, it must be wound around in circumferential units and, although fine weight adjustment is difficult, using the method of winding of the present invention, fine adjustment of weight for winding one narrow wire rod becomes possible. In addition, the weight ratio of the third layer in the formed filter can be finely adjusted.

In the present invention, it is desirable that one or both of the wire rod that forms the first layer and the wire rod that forms the third layer are sintered. It is desirable that this sintering be performed after formation of the third layer although it may be performed when each layer is manufactured. That is to say, for the formation of the first layer, the above wire rod is wound in a helical form at a prescribed pitch angle with respect to a member that constitutes a core rod and although, after the completion of the winding of the first layer (or the completion of the winding of the third layer) the core rod is then pulled out, because there is a high possibility that fraying will be formed at this time in the initial winding section of the first layer, the fraying of the wire material after the filter is formed can be prevented by sintering and integration of the wire rods.

It should be noted that the first layer and third layer can, naturally, be formed without sintering and, in this case, because the wire rods are not bonded, a product of high tensibility can be formed.

Further, in the filter for the air bag gas generator of the present invention, an intersecting angle of the wire rods vertically superposed in the radial direction of the first layer (intersecting angle that opens toward the axial direction. That is to say, θ in the later described FIG. 1) is greater than 0° and no more than 90°, and more preferably 10 to 60°, can be produced. This intersecting angle lies in the direction in which the axial core of the filter to be formed is drawn and is the angle at which the wire rods intersect. By forming in this way, an adequate volume of voids can be ensured in the inner part of the first layer for holding the combustion residue (including the liquid component) that is generated by the combustion of the gas generating agent and, in addition, an adequate cooling effect can be ensured and, for when there is a passing of gas, the optimum passing resistance can be formed. Furthermore, slip and fraying during the winding of the wire rod can be prevented.

In the filter for an air bag gas generator of the present invention, it is desirable that the second layer project from the end surface in the axial direction of the filter formed in a cylindrical shape. If formed in this way, in the arrangement of the filter in the gas generator housing, the filter can be arranged so that the projecting second layer is squashed (or is elastically deformed) against the housing inner surface and, as a result, the gap between the housing inner surface and the filter end surface is removed and a short pass for gas from the filter end surface can be prevented. Where a function such as this (short pass prevention function) is fulfilled by the second layer, said second layer, in order to minimize the unevenness that is produced when it is squashed, is desirably formed from a wire material having a wire diameter of not more than 1 mm, and more particularly a wire rod of not more than 0.5 mm, or a wire mesh that comprises this wire rod. The projecting height of the second layer is preferably 1 to 3 mm, and more particularly 1 to 2 mm. The projecting end portion of the second layer may be either in one end side in the axial direction or both end sides in the axial direction.

The filter for an air bag gas generator as described above is suitable for purifying gas that is generated by the combustion of the solid gas generating agent having a combustion temperature of not more than 2000 K. Iron is preferred as the wire rod to be used for the first layer and, although this value of 2000 K is higher than the melting point of iron, little time is required for the solid gas generating agent to combust and a certain time is taken for the generated heat to be transmitted to the first layer. Accordingly, even if contact with the first layer occurs, the temperature is unlikely to immediately rise to the temperature at which melting will occur. As a result, there are no problems caused if the combustion temperature is a little higher than the melting point.

In the filter for an air bag gas generator according to the present invention, the manufacture of the filter for the air bag gas generator of the present invention is simple and, in addition, because the first layer is formed by the continuous winding of a single wire rod, the tensibility is improved. In addition, voids are formed in the inner part of the first layer by the winding of the wire rod whereby, simultaneously with the collection of liquid state residue with the first layer, fine combustion residue can be additionally collected by the second layer.

In addition, in a filter for an air bag gas generator in which the projection of the second layer from the end surface in the axial direction of the filter is arranged and when it is arranged in the gas generator, more particularly to abut against the housing inner surface, a short pass for gas between the filter end surface and the housing inner surface can be reliably prevented by the elastic deformation of the projecting second layer.

BRIEF DESCRIPTION OF THE DIAGRAMS

Figure 2:
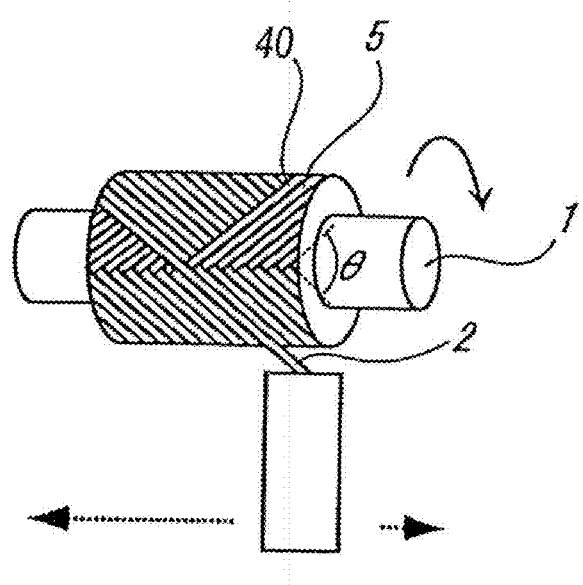
Figure 3:
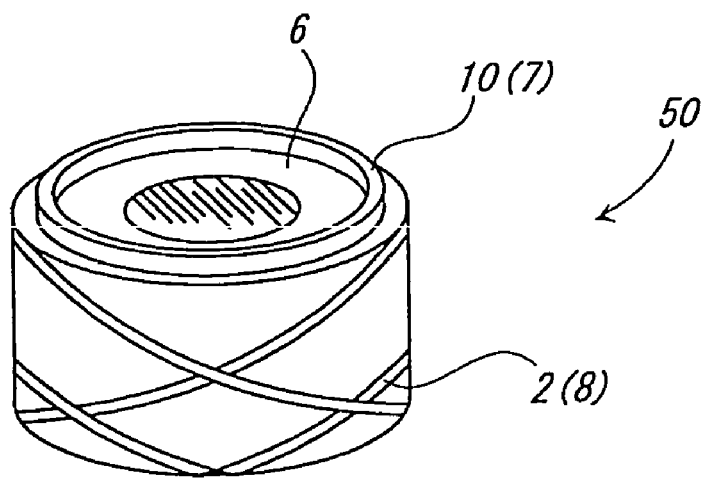

FIG. 1 is a schematic view illustrating the manufacturing process of the first layer of the filter.
FIG. 2 is a schematic view illustrating a state in which the wire rod has been further wound from the state of FIG. 1.
FIG. 3 is a schematic view of the filter.
FIG. 4 is a cross-sectional view of the gas generator illustrating the state in which the filter of FIG. 3 is arranged.

LIST OF ELEMENTS

1 Core rod
2 Wire rod
3 Wire rod supply end
4 Igniter
6 First layer
7 Second layer
8 Third layer
10 Second layer end portion
16 Gas generating agent
23 Transfer charge
33 Housing
50 Filter
α Pitch angle
θ Intersecting angle

EMBODIMENT OF THE INVENTION

FIG. 1 is a schematic view that illustrates a process of manufacturing a first layer 6 in a process of manufacturing a filter 50 for an air bag gas generator according to the present embodiment. At the time of forming the first layer 6, the starting end of a wire rod 2 (for initiation of the winding) for the first layer is fixed on a cylindrical core rod 1 and, while the core rod 1 is rotated about a central axis (in FIG. 1, in the direction shown by the solid arrows), a supply end 3 of the wire rod 2 is reciprocated to the left and right (in the direction shown by the dotted arrows in FIG. 1). The wind pitch (or helical pitch) and pitch angle α of the wire rod 2 for the first layer 6 to be formed are adjusted on the basis of the wind diameter, the revolutions (rpm) of the core rod, and the speed of the stroke of the supply end 3. It should be noted that the outer diameter of the core rod 1 is equivalent to the inner diameter of the cylindrical filter that is to be manufactured.

FIG. 2 is a schematic view illustrating a state in which the winding process shown in FIG. 1 has progressed further. The state shown in FIG. 2 approximates the state formed upon completion of the first layer 6. In this diagram as well, the revolutions of the core rod 1 and the stroke speed of the wire rod supply end 3 are adjusted in such a way that adjacent wire rods (40 and 5) are essentially parallel, and in such a way that the intersecting angle θ of the intersecting wire rods is greater than 0° and not more than 90°, and preferably 10° to 60°. More particularly, because the superposed wire rods are formed to have a symmetrical pitch angle α, the intersecting angle θ is twice the pitch angle α.

By the employment of a first layer 6 formed by a method of weaving such as this, voids are more likely to be formed in the inner part of the layer than, for example, a plain weave wire mesh or the like of the prior art that has been superposed in a large number of layers. That is to say, the wire rods of plain weave wire meshes or the like pass in both the vertical and horizontal so, in the superposing thereof in a plurality of layers, the openings between the wire rods are closed due to the fact that the wire rod of the layer to be wound over a space between the wire rods of the initially wound layer is arranged to be sequentially laminated thereon whereby, as a result, it is difficult to ensure the formation of voids in the filter inner part and gas is unlikely to flow there-through. In addition, because the wire rods interfere with each other in the manner as described above, the end surface in the axial direction of a wire rod wound in a large number of layers is uneven. For this reason, where the end surface is abutted against the inner surface or the like of the gas generator housing, a gap is formed as a result of the unevenness of the end surface and thereby, a short pass for gas is likely to be produced. Further, because filters formed in a cylindrical shape by the winding of a plain weave wire mesh in a large number of layers lack elasticity in the axial direction, it is difficult to alleviated this unevenness by the implementing of compression in the axial direction. In filters that employ a plain weave wire mesh, blockage caused by a combustion residue is liable to occur as a result of the narrowing of the openings in accordance with the number of laminated layers.

FIG. 3 is a perspective view illustrating the filter 50 for an air bag gas generator of this embodiment which, employing the first layer 6 formed as shown in the above FIG. 2, is formed by the provision on the outer side thereof of a further second layer 7 and third layer 8. That is to say, the first layer 6 is formed by the further winding of the wire rod 2 from the state shown in FIG. 2 and, thereafter, the formed first layer 6 is removed from the core rod 1 or the first layer 6 is remained affixed to the core rod in this state and then, a second layer 7, which is formed by the employment of a wire mesh, is provided on the outer perimeter of the first layer 6. As an example of the second layer, it can be formed by the winding of a wire rod, which has the wire diameter of 0.02 to 0.7 mm, in the same way as the first layer, and more particularly it is desirably formed by the employment of a wire mesh formed by the knitting in a plain Dutch weave or twilled Dutch weave of a wire rod which has the wire diameter of 0.02 to 0.7 mm. Although openings between the wire rods could not be confirmed when the wire mesh knitted into a plain Dutch weave or twilled Dutch weave was viewed from the direction perpendicular to the plane of the wire mesh, the openings between the wire rods were able to be confirmed when it was viewed from the diagonal direction. That is to say, if a second layer is formed by the employment of this type of wire mesh, the gas, that reaches the second layer 7 after passing through the first layer 6, penetrates the second layer after colliding with the wire rod of the second layer 7 and undergoing one directional change. Accordingly, the contact time between the gas and the wire rod of the wire mesh that forms the second layer 7 is lengthened, an adequate cooling action is demonstrated and, furthermore, by the prevention of the passing of a combustion residue because of the fineness (openings) of the second layer 7, a physiological filter action is also demonstrated. The second layer 7 can be formed by the winding of the above Dutch weave wire mesh one to three times around the outer side of the first layer 6. It should be noted that, as the filter material employed in the second layer, in addition to that described above, apart from wire meshes of various types such as a plain Dutch weave wire mesh, twilled Dutch weave wire mesh and plain weave wire mesh of specific filter particle size, plate materials such as punched metal, metal lath and expanded metal and, furthermore, ceramic fibres and stainless steel fibres can be used.

Furthermore, a third layer 8 can be formed by winding of a wire rod (cross-sectional area, cross-sectional shape) 2 identical to the wire rod 2 used for forming the first layer in the same way as that employed for the forming of first layer 6 and, furthermore, in this case, the winding can also be performed so that an intersecting angle of the intersecting wire rods is the same as that of the first layer. The third layer 8 should comprise a function for holding the outermost perimeter of the second layer 7, and it need not necessarily comprise a filtering function. That is to say, the combustion residue generated by the combustion of the gas generating agent is removed as it passes through the first layer 6 and second layer 7 and, furthermore, because the gas is also adequately cooled, the third layer need only be wound to the extent that the second layer 7 is exposed, or wound to the extent that the second layer 7 is pressure-attached and fixed to the first layer 6. Naturally, in accordance with the combustion characteristics (temperature of combustion and characteristics and amount and so on of the generated combustion residue) of the gas generating agent used with the filter 50, it may be wound to the same extent as the first layer 6, and the method of winding of the wire rod may be different to that of the first layer 1.

More particularly, the filter 50 shown in FIG. 3 is formed overall in an approximately cylindrical shape and the end portion 10 of the second layer 7 projects from both end surfaces in the axial direction. The projecting height of the second layer end portion 10 is of about 1 to 3 mm from the end surface of the filter section that essentially contributes to the purification and cooling of the gas, that is to say, the end surface of the section excluding the third layer 8 that principally fulfills the function of supporting the second layer 7 (in reality, the end surface of the first layer 6). By the projecting of the end portion of the second layer 7 in this way, when the filter is assembled inside the gas generator housing, as shown in the later described FIG. 4, a short pass for the gas passing through the filter can be prevented by the elastic deformation and squeezing of the projecting second layer by the housing inner surface or another filter supporting member, and by the blocking of the space between the filter end surface, housing inner surface or other filter supporting member. The second layer 7, in addition to projecting from both end portions of the filter as shown in this embodiment, may be formed to project from only a single end portion side.

In addition, the wire rod used for the first layer and the third layer is sintered. In this case, the sintering may be implemented following the formation of the first layer whereupon the second layer is wound, but it is desirable that the sintering is implemented following formation of the third layer. Because a firm adherence between the wire rods occurs as a result, a further improvement in shape retaining strength is produced.

FIG. 4 is a cross-sectional view of a gas generator for an air bag in which the filter 50 of the above embodiment has been assembled. In the gas generator shown in the diagram, a housing 33 which constitutes an outer perimeter container is formed from a diffuser 31 provided with a gas discharge port 11 and a closure 32 joined to the opening side of the diffuser 31, an inner cylinder 13 is arranged in the housing 33 concentrically with said housing and is integrated by welds 12, 17. The inner cylinder 13 stores an igniter that is actuated upon receipt of an actuation signal issued from an external device at the time of impact and a transfer charge 23 ignited by a flame when the igniter is actuated, and the igniter 4 is affixed to an igniter collar 14 and this igniter collar is fixed by crimping of the end portion of the inner cylinder 13.

A gas-generating agent accommodating space 22 into which a solid gas-generating agent is charged is provided in the outer side in the radial direction of the inner cylinder 13, and the flame of the transfer charge 23 ejects into the gas-generating agent accommodating space 22 through a flame-transferring hole 26 provided in the inner cylinder 13 to ignite and combust the gas-generating agent 16. This flame-transferring hole is closed by a sealing tape 27 before activation.

The filter 50 as described above is arranged in such a way as to enclose the outer side of the gas-generating agent accommodating space 22 in the radial direction. The filter 50, as is described with reference to the above FIG. 3, is formed by the provision of a first layer 6 on the inner circumferential side, and the provision on the outer side thereof of a second layer 7 and a further third layer 8 and, more particularly, the second layer 7 projects in an axial direction from the end surfaces of the first and third layers (see reference number 10 in FIG. 3). The total length (axial direction length) of the filter 50 is the same as the height H of the inside of the housing 33, or it is formed to be marginally longer thereof. By the adjustment of the length of the filter 50 in this way, because it is compressed in the axial direction and arranged so that the elastic deformation is maintained when it is arranged in the housing, such a short pass can be prevented that gas, that should pass originally through the filter 50, passes between the end surface in the axial direction of the filter 50 and the inner surface of the housing 33. Furthermore, because the end portion 10 of the second layer 7 is squashed between the filter end surface and housing inner surface and the gap therebetween is blocked, a short pass for gas can be even more reliably prevented.

The gas that passes through the filter 50 formed and arranged as described above is cleaned as a result of the removal of the combustion residue, and it is adequately cooled. The gas passes though an ensured space 24 on the outer side of the filter 50 in the radial direction and reaches the gas discharge port 11 whereupon, by the rupture of the sealing tape 25 thereon, it is discharged through said gas discharge port 11. It should be noted that the symbol 15 used in FIG. 4 refers to a flange for the affixing of the gas generator.

The invention claimed is:

1. A filter for an air bag gas generator comprises:
    a first layer formed by helically winding a wire rod having a cross-sectional area of 0.03 to 0.8 mm$^2$ in such a way that a pitch angle of wire rods vertically superposed in the radial direction is symmetrical;
    a second layer disposed on the outer side of the first layer in the radial direction and formed to have a finer filter particle size than the first layer, and
    a third layer disposed on the outer side of the second layer in the radial direction, wherein
    the second layer is formed by winding a wire rod having a smaller cross-sectional area than the wire rod that forms the first layer to form a wire mesh, projects in an axial direction beyond the end surfaces of the first and third layers, and is formed by winding the wire mesh one to three times around the outer side of the first layer,
    the third layer is formed from a wire rod having a larger cross-sectional area than the wire rod of the second layer on the outer side of the second layer,
    the first layer, the second layer and the third layer are sintered to integrate the layers.

2. The filter for an air bag gas generator according to claim 1, wherein the third layer is formed by helically winding the wire rod in such a way that the pitch angle of wire rods vertically superposed in the radial direction is symmetrical.

3. The filter for an air bag gas generator according to claim 1, wherein the intersecting angle of wire rods of the first layer vertically superposed in the radial direction is greater than 0° and not more than 90°.

4. The filter for an air bag gas generator according to claim 1, wherein, in the wire rod forming the first layer and helically wound and vertically superposed in the radial direction, the section vertically superposed in the radial direction is formed flat.

5. The filter for an air bag gas generator according to claim 1, wherein the second layer is formed from a wire rod having a wire diameter of 0.02 mm to 0.7 mm.

6. The filter for an air bag gas generator according to claim 1, wherein the filter for an air bag gas generator purifies the gas generated by the combustion of a solid gas generating agent having a combustion temperature of not more than 2000 K.

7. The filter for an air bag gas generator according to claim 1, wherein the wire mesh of the second layer is a plain Dutch weave wire mesh, a twilled Dutch weave wire mesh or a plain weave wire mesh.

8. The filter for an air bag gas generator according to claim 1, wherein the filter particle size of the second layer is 6 to 400 µm.

9. The filter for an air bag gas generator according to claim 1, wherein the filter particle size of the second layer is 30 to 100 µm.

10. A gas generator for an air bag in which gas is generated for inflating an air bag to restrain a passenger upon collision of a vehicle, comprising:
    an ignition device as an actuation initiation device of the gas generator;
    a solid gas generating agent that is ignited and burned by the ignition device to generate a gas for inflating the air bag;
    a housing; and
    a filter for cooling the gas, wherein
    the filter is the filter according to claim 1, and
    the projected portion of the second layer of the filter is squashed against the housing's inner surface so that a gap between the housing's inner surface and the filter's end surface is eliminated to prevent gas from leaking at the filter's end surface.

11. The gas generator for an air bag according to claim 10, wherein the wire mesh of the second layer is a plain Dutch weave wire mesh, a twilled Dutch weave wire mesh or a plain weave wire mesh.

12. The gas generator for an air bag according to claim 10, wherein the filter particle size of the second layer is 6 to 400 µm.

13. The gas generator for an air bag according to claim 10, wherein the filter particle size of the second layer is 30 to 100 µm.

14. A method for the manufacture of a cylindrical filter for an air bag gas generator, comprising the steps of:
    forming a first layer by helically winding a wire rod having a cross-sectional area of 0.03 to 0.8 mm$^2$ in at least one reciprocating process in the axial direction of the filter to be manufactured; and
    forming a second layer having a finer filter particle size than the first layer on the outer side of the first layer in the radial direction by winding a wire rod having a smaller cross-sectional area than the wire rod that forms the first layer to form a wire mesh so that the wire mesh is wound one to three times around the outer side of the first layer and the second layer projects in an axial direction beyond the end surfaces of the first and third layers, and
    forming a third layer by winding a wire rod having a larger cross-sectional area than the wire rod of the second layer on the outer side of the second layer in the radial direction, and
    sintering the first layer, the second layer and the third layer to integrate the layers.

15. The method for the manufacture of a filter for an air bag gas generator according to claim 14, wherein the second layer is formed from a filter material having a filter particle size 6 to 400 µm, and a third layer is further formed on the outer side of the second layer in the radial direction by winding a wire rod having a larger cross-sectional area than the wire rod of the second layer.

16. The method for the manufacture of a cylindrical filter for an air bag gas generator according to claim 14, wherein the wire mesh of the second layer is a plain Dutch weave wire mesh, a twilled Dutch weave wire mesh or a plain weave wire mesh.

17. The method for the manufacture of a cylindrical filter for an air bag gas generator according to claim 14, wherein the filter particle size of the second layer is 6 to 400 µm.

18. The method for the manufacture of a cylindrical filter for an air bag gas generator according to claim 14, wherein the filter particle size of the second layer is 30 to 100 µm.

* * * * *